Oct. 30, 1951     E. A. ARP     2,573,531
OFFSET CONTACT ALIGNMENT INDICATOR
Filed June 6, 1947     2 SHEETS—SHEET 1
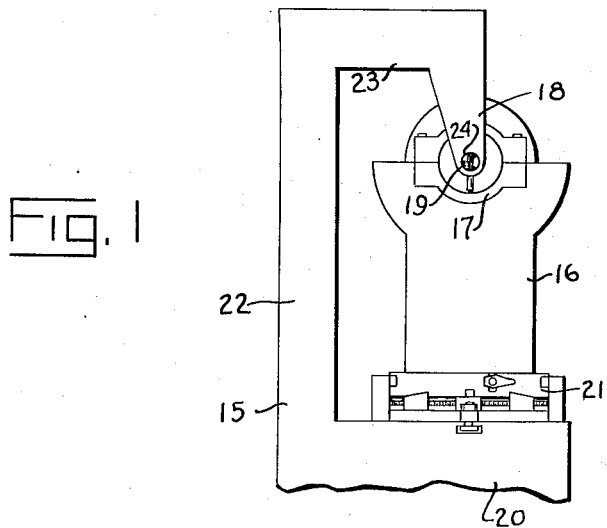
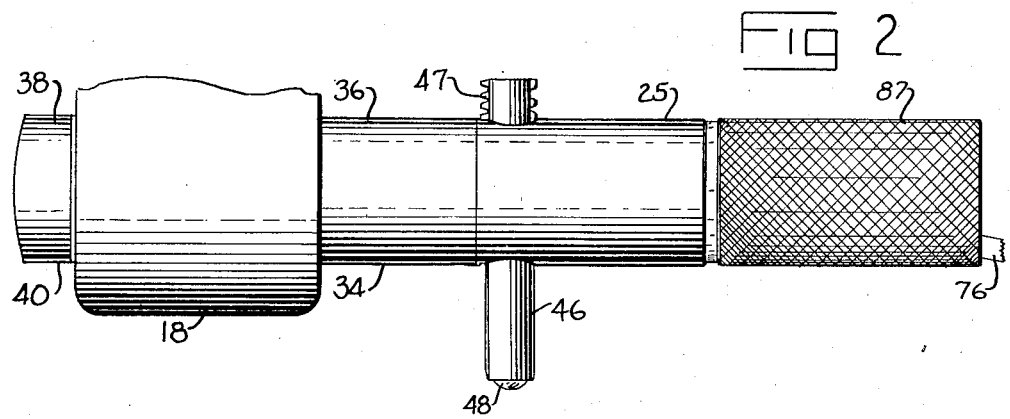
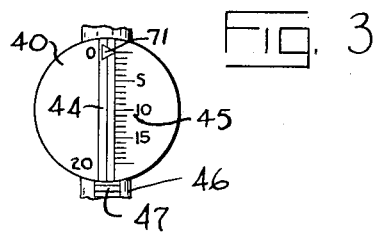
INVENTOR
EWALD A. ARP
BY
*W. H. Braddock*
ATTORNEY Oct. 30, 1951      E. A. ARP      2,573,531
OFFSET CONTACT ALIGNMENT INDICATOR
Filed June 6, 1947      2 SHEETS—SHEET 2
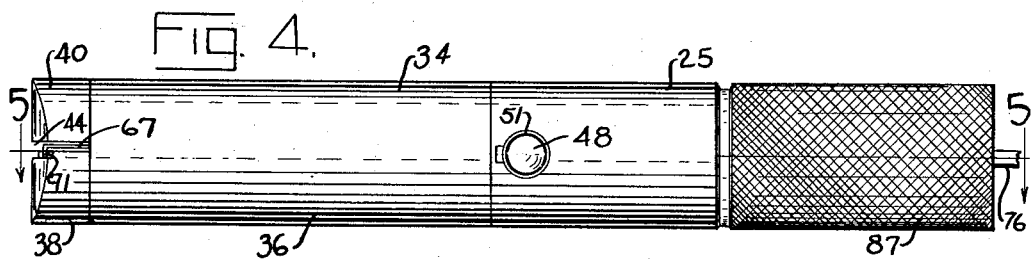
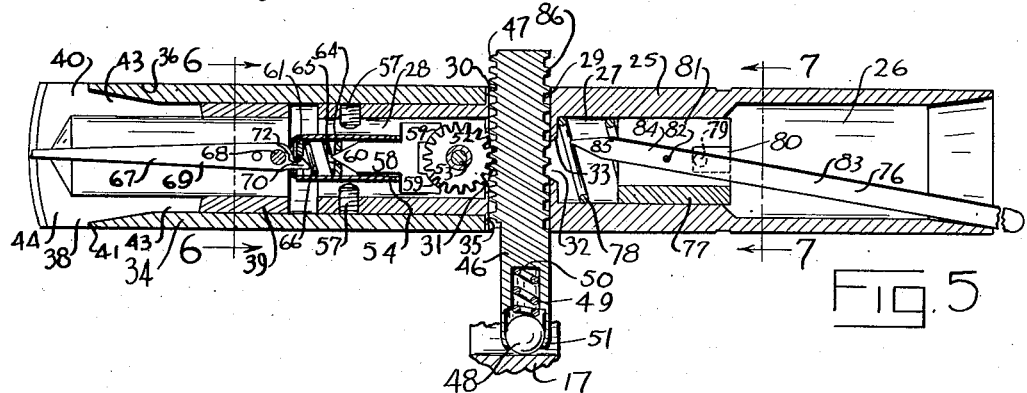
INVENTOR
EWALD A. ARP
BY
G. H. Braddock
ATTORNEY

UNITED STATES PATENT OFFICE 2,573,531

OFFSET CONTACT ALIGNMENT INDICATOR

Ewald A. Arp, Minneapolis, Minn., assignor to Tobin-Arp Manufacturing Company, Minneapolis, Minn., a corporation of Minnesota Application June 6, 1947, Serial No. 752,959

16 Claims. (Cl. 33—172)

This invention relates to an indicating device adapted for use in the operation of relatively centering and alining a bearing to be bored or rebored and an appropriate tool for boring or reboring the bearing. Stated otherwise, the invention has relation to an indicating device which can be employed to readily and dependably check the accuracy with which a bearing to be bored and an appropriate tool for boring said bearing are relatively centered and alined.

The indicating device as herein illustrated and described has been devised to be especially useful in checking accuracy in the operation of centering and alining boring bars with crank shaft bearings and cam shaft bearings of internal combustion engines.

An object of the invention is to provide a novel and improved indicating device for checking the accuracy of the centered and alined relation of a bearing to be bored or rebored and an appropriate tool for boring or reboring the bearing.

A further object is to provide an indicating device which will include mechanism of novel and improved construction for accurately checking the centered and alined relation of a bearing to be bored or rebored and an appropriate tool for boring or reboring the bearing.

And a further object is to provide an indicating device, for use in the operation of relatively centering and alining a bearing to be bored or rebored and an appropriate tool for boring or reboring the bearing, wherein will be incorporated desirable and improved features and characteristics of construction novel both as individual entities of said indicating device and in combination.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification,

Fig. 1 is an elevational view, partially broken away, of a machine for boring engine bearings with an engine block situated in the machine as when being properly centered and alined with relation to a boring bar support or locating unit of said machine, disclosing the indicating device of the invention as when applied to use;

Fig. 2 is an enlarged elevational view of said indicating device also disclosing a fragment of a boring bar support or locating unit of the machine of Fig. 1 in which the indicating device is mounted;

Fig. 3 is an end elevational view of said indicating device as it would appear from the left in Fig. 4;

Fig. 4 is an elevational view of the indicating device as it would appear from the bottom of the sheet in Fig. 2;

Fig. 5 is a central longitudinal sectional view, taken substantially on line 5—5 in Fig. 4, disclosing a ball point of an actuator bar of the indicating device as when engaged against the internal surface of a bearing to be bored;

Fig. 6 is an enlarged transverse sectional view, taken substantially on line 6—6 in Fig. 5;

Fig. 7 is an enlarged transverse sectional view, taken substantially on line 7—7 in Fig. 5; and Fig. 8 is a fragmentary sectional view detailing parts, including an actuator gear, a clutching element and a hollow cylindrical element, of said indicating device.

In Fig. 1 of the drawings, 15 denotes a machine for boring engine bearings, 16 represents an engine block as when situated in said machine with one of its crank shaft bearings 17 being centered and alined with a boring bar support or locating unit 18 of the machine, and 19 designates an indicating device made according to the invention as when applied to use to check the accuracy of the relative centering and alining of said crank shaft bearing 17 and boring bar support or locating unit 18 during the centering and alining operation.

A main frame of the machine 15 includes a supporting base 20 for a carriage or platform 21, a standard 22 extending vertically upwardly from said supporting base 20 at a side of said carriage or platform 21 and a horizontal arm 23 at the upper end of said standard 22 with which the boring bar support or locating unit 18 is integral or rigid. The horizontal arm 23 is at the side of the standard 22 adjacent the supporting base 20, and said boring bar support or locating unit 18 is directly above and in properly spaced relation to the carriage or platform 21. A usual finished internal cylindrical bearing surface of the boring bar support or locating unit 18 is denoted 24. The machine 15 includes mechanism, forming no part of the present invention and not necessary to be described, for accomplishing rotative adjustment and anchoring of the engine block 16 and for accomplishing vertical and horizontal adjustment of the carriage or platform 21, thus to accomplish vertical and horizontal alinement of the crank shaft bearing 17 and the boring bar support or locating unit 18. Of course, vertical and horizontal alinement of said crank shaft bearing and boring bar support or locating unit could be accomplished by manipulation of the boring bar support or locating unit relative to the engine block 16, or by relative manipulation of both said boring bar support or locating unit and said engine block. The indicating device herein illustrated and described is for checking the accuracy with which a bearing to be bored or rebored and an appropriate tool for boring or reboring said bearing are relatively centered and alined, not matter how the centering and alining operation is accomplished.

A body member 25 of the indicating device is constituted as an elongated hollow cylindrical element open at both of its opposite ends. An end portion of said body member or hollow cylindrical element 25 bounds or defines a first chamber or concavity 26, an intermediate portion of the body member or hollow cylindrical element bounds or defines a second chamber or concavity 27, and the end portion of said body member or hollow cylindrical element at the side of the second chamber or concavity 27 opposite the first chamber or concavity 26 bounds or defines a third chamber or concavity 28. The first and second chambers or concavities 26 and 27 are in alined, coaxial, contiguous relation, and the first chamber or concavity 26 has diameter and length somewhat greater than the diameter and length of the second chamber or concavity 27 in the disclosure as made. The second and third chambers or concavities 27 and 28 are in alined, coaxial, spaced relation, the second chamber or concavity 27 has diameter somewhat greater than the diameter of the third chamber or concavity 28, and said second and third chambers or concavities are of substantially equal length. A solid portion of the body member or hollow cylindrical element 25, between the second and third chambers or concavities 27 and 28, includes both an open-ended passageway 29 extending diametrically across said body member or hollow cylindrical element in perpendicular relation thereto and an open-ended elongated rectilinear slot 30, contiguous with said passageway 29 at the side thereof adjacent the third chamber or concavity 28, also extending diametrically across the body member or hollow cylindrical element in parallel relation to the passageway. Said passageway 29 and said elongated rectilinear slot 30 are in a plane passed diametrically through all of the first, second and third chambers or concavities 26, 27 and 28. An intermediate portion of the length of the elongated rectilinear slot 30, at the base of said elongated rectilinear slot, is open, as at 31, to the adjacent end of the third chamber or concavity 28, and an intermediate portion of the length of said passageway 29 is open, as at 32, to the adjacent end of the second chamber or concavity 27. A transverse wall of the body member or hollow cylindrical element 25, in surrounding relation to the opening 32 and bounding or defining the adjacent end of the second chamber or concavity 27, is indicated 33. A knurled surface of the end portion of the body member or hollow cylindrical element 25 having the first chamber or concavity 26 is denoted 87.

An inner end portion of a cylindrical shell or sleeve 34 of the indicating device is snugly fitted upon the end portion of the body member or hollow cylindrical element 25 bounding or defining the third chamber or concavity 28 with the inner end of said cylindrical shell or sleeve engaged against an annular flange 35 of said body member or hollow cylindrical element in surrounding relation to said third chamber or concavity and in adjacent relation to the passageway 29 and the elongated rectilinear slot 30. The shell or sleeve 34 includes a finished external cylindrical bearing surface 36, and a locking screw 37 retains said shell or sleeve in fixed relation to the body member or hollow cylindrical element 25. An outer end portion of the shell or sleeve 34 projects outwardly beyond the outer end of the end portion of the body member or hollow cylindrical element 25 which bounds or defines the third chamber or concavity 28. In the disclosure as made, the outer end portion of said shell or sleeve 34 which projects outwardly from the body member or hollow cylindrical element 25 is somewhat longer than the inner end portion of the shell or sleeve which is snugly fitted upon said body member or hollow cylindrical element.

A head member 38 of the indicating device is constituted as an elongated hollow cylindrical entity 39 with head proper 40. The end portion of the hollow cylindrical entity 39 opposite the head proper 40 is snugly fitted into the outer end portion of the shell or sleeve 34 with the outer end of said shell or sleeve engaged against an annular shoulder 41 of said head member 38 in surrounding relation to said hollow cylindrical entity 39 and in adjacent relation to said head proper 40. The construction and arrangement are such that when the head member 38 is inserted in the shell or sleeve 34, the end of the elongated hollow cylindrical entity 39 spaced from or opposite the head proper 40 is situated in spaced relation to the adjacent end of the body member or hollow cylindrical element 25. A locking screw for retaining the head member 38 in fixed relation to said shell or sleeve 34 is represented 42. The outer end portion of the elongated hollow cylindrical entity 39, adjacent the head proper 40, includes alined, oppositely disposed, elongated slots 43, 43 which extend longitudinally of said elongated hollow cylindrical entity and are open to an open-ended elongated slot 44 extending diametrically across said head proper. Calibrations on an outer surface of the head proper 40, at a side of the elongated slot 44 and spaced apart in direction transversely of the head member 38, are denoted 45.

An actuator bar 46 of the indicating device is snugly, slidably situated in the passageway 29, and a rack 47 integral with said actuator bar is snugly, slidably situated in the elongated rectilinear slot 30. A ball point 48 at an end of the actuator bar 46 is normally resiliently urged outwardly by a compression coil spring 49 seated between said ball point and the base 50 of a pocket in said actuator bar which receives the ball point and said compression coil spring. An oblique annular flange 51 upon the corresponding end of the actuator bar precludes possibility of removal of said ball point from said actuator bar. The actuator bar 46 can be of any length suitable to its intended purpose, and actuator bars such as 46 of different lengths can be selectively employed in a single indicating device.

An actuator gear 52, pivotally mounted on a cross pin 53 supported in the body member or hollow cylindrical element 25 and situated in the third chamber or concavity 28, lies in the plane of and is in mesh with the rack 47.

A hollow cylindrical element 54 has a bifurcated end portion providing oppositely disposed extension pieces 55, 55 of said hollow cylindrical element rotatably mounted, as at 56, 56, on the cross pin 53 at opposite sides of the actuator gear 52. That is to say, said actuator gear 52 is situated between the extension pieces 55, 55 in spaced relation to the body portion of the hollow cylindrical element 54. The construction and arrangement will be such that said actuator gear 52 and said hollow cylindrical element 54 will be permanently situated at the midlength of the cross pin 53. The hollow cylindrical element 54 is supported on the cross pin 53 for swinging movement between spaced apart, oppositely disposed stop members 57, 57 in the body member or hollow cylindrical element 25 at either side of said hollow cylindrical element 54 in spaced relation to the cross pin 53, adjacent the outer end of the third chamber or concavity 28, and the outer end portion of said hollow cylindrical element 54 is situated within the shell or sleeve 34 between the inner end of the body member or hollow cylindrical element 25 and the head member 38.

A clutching element for normally frictionally retaining the actuator gear 52 and the hollow cylindrical element 54 in fixed relation, is indicated 58. As disclosed, said clutching element 58 is constituted as a flat piece of fibrous material. A body portion of the clutching element is snugly situated in the space between the oppositely disposed extension pieces 55, 55 of the hollow cylindrical element 54 in alined relation with the actuator gear 52 in direction longitudinally of the body member or hollow cylindrical element 25, an end of said clutching element at the side of its body portion adjacent the actuator gear includes spaced apart, obliquely disposed friction surfaces 59, 59 engaged against the teeth of said actuator gear, and a pointed end portion 60 of the clutching element at the side of its body portion opposite the actuator gear is situated within the body portion of the hollow cylindrical element 54.

A pointer arm actuator 61, situated in the end portion of said hollow cylindrical element 54 spaced from or opposite the cross pin 53, is an element of disc configuration in the disclosure as made. A side cut-out portion 62 of the actuator 61 is for a purpose to be made plain, and an oblique annular flange 63 upon the end of the hollow cylindrical element 54 adjacent the actuator 61 is for retaining said actuator in said hollow cylindrical element.

A clutching element retainer 64, situated in an intermediate portion of the hollow cylindrical element 54, also is an element of disc configuration in the disclosed embodiment of the invention. A center cut-out portion 65 of the retainer 64 receives the pointed end portion 60 of the clutching element 58, and a compression coil spring 66, within said hollow cylindrical element 54 between the actuator 61 and the retainer 64, exerts resilient pressure against said retainer and clutching element adapted to cause the friction surfaces 59, 59 of the clutching element to be resiliently pressed against the teeth of the actuator gear 52. The point of the end portion 60 is situated between said actuator 61 and retainer 64, and the retainer is engaged against diverging side surfaces of said end portion 60 at opposite sides of said point.

A pointer arm 67, rotatably mounted on a pivot pin 68 supported in the inner end portion of the elongated hollow cylindrical entity 39 in alined relation with the hollow cylindrical element 54 in direction longitudinally of the indicating device, includes a longer leg 69 thereof at the side of said pivot pin 68 opposite said hollow cylindrical element 54 and a shorter leg 70 thereof at the side of the pivot pin 68 adjacent the hollow cylindrical element. The longer leg 69 is in alinement with the elongated slots 43, 43 in the hollow cylindrical entity 39 and with the elongated slot 44 across the head proper 40 in direction transversely of the head member 38, and an offset portion 71 upon the outer end of said longer leg 69 is situated to be movable along the calibrations 45. The cutout portion 62 of the actuator 61 is at the side of said actuator which is adjacent the ball point end of the actuator bar 46 and in alined relation with the shorter leg 70 of the pointer arm 67. The free end portion of said shorter leg 70 is situated in the side cutout portion 62 and includes a knife edge 72 engaged against the adjacent edge of said actuator 61. A coil spring 73, upon the pivot pin 68 and having one of its ends 74 attached to the longer arm 69 and its other end 75 attached to the head member 38, retains the knife edge 72 against the actutaor 61 and normally retains the hollow cylindrical element 54 against the stop member 57 at the side of said hollow cylindrical element opposite the ball point end of the actuator bar 46, and said coil spring 73 also normally situates the pointer arm 67 so that its offset portion 71 is positioned at the end of the elongated slot 44 at the side of the indicating device adjacent said ball point end of said actuator bar. See Fig. 3.

In the disclosed embodiment of the invention, the actuator bar 46, the actuator gear 52, the hollow cylindrical element 54, the clutching element 58 and the pointer arm 67 all lie substantially in a single plane passed longitudinally and diametrically through the indicating device.

An actuator arm for the actuator bar 46 is denoted 76, and a supporting block for said actuator arm is represented 77.

The supporting block 77 is snugly, slidably mounted in the second chamber or concavity 27, and a compression coil spring 78, between said supporting block and the transverse wall 33, normally retains the supporting block in spaced relation to said transverse wall, engaged against a stop member 79 supported by the body member or hollow cylindrical element 25 and situated in a transverse slot 80 in the outer end of said supporting block. The stop member 79 permits the supporting block 77 to have movement longitudinally of the indicating device and limits possibility of rotative movement of said supporting block.

The actuator arm 76 is situated in a longitudinally extending slot 81 of the supporting block 77 which is disposed in perpendicular relation to the transverse slot 80, and said actuator arm is rotatably mounted on a pivot pin 82 supported by and situated substantially at the midlength of said supporting block. The longitudinally extending slot 81 opens to both of the opposite ends of the supporting block 77, and the actuator arm 76 is in alinement with the actuator bar 46 and mounted for swinging movement in a plane extending diametrically of the body member or hollow cylindrical element 25 and longitudinally of said actuator bar. Said actuator arm 76 includes a longer leg 83 thereof at the side of said pivot pin 82 opposite the actuator bar 46 and a shorter leg 84 thereof at the side of the pivot pin 82 adjacent said actuator bar. The longer leg 83 extends through the first chamber or concavity 26 and projects beyond the corresponding end of the body member or hollow cylindrical element 25, and the shorter leg 84 includes a pointed end portion 85 adapted to be engaged with teeth of a rack 86 rigid with the actuator bar 46 and situated diametrically opposite and in alined relation with the teeth of the rack 47.

The actuator bar 46 can be forcibly slid manually along the passageway 29 in instances when said actuator bar is conveniently accessible. The actuator arm 76 is for forcibly sliding the actuator bar 46 along said passageway 29 in instances when said actuator bar may not be conveniently accessible for manual manipulation, as when the actuator bar is in a small bearing and an operator cannot readily and easily have access to it. The manner in which the actuator arm 76 can be manipulated to cause the actuator bar 46 to be slid in the passageway 29, toward the ball point end of said actuator bar in practical use of the indicating device, will be obvious. Said actuator arm 76 is adapted to be grasped and pushed inwardly, together with the supporting block 77 as a unit and against resilient action of the compression coil spring 78, until the pointed end portion 85 is engaged between teeth of the rack 86, and then swung upon the pivot pin 82 as an axis to cause the actuator bar to be moved longitudinally. Upon release of the actuator arm 76, the compression coil spring 78 of course will react to cause the pointed end portion 85 to be removed from the rack 86 and the supporting block 77 to be pressed against the stop member 79.

In practical use of the indicating device, the shell or sleeve 34 is inserted in a support or locating unit, such as the boring bar support or locating unit 18, with the finished external cylindrical bearing surface 36 of said shell or sleeve nicely fitted to a finished internal cylindrical bearing surface of said support or locating unit, such as the finished internal cylindrical bearing surface 24 of said boring bar support or locating unit 18, the actuator bar 46 is manipulated so that its ball point 48 is engaged with the internal surface of a bearing, such as the internal surface of the crank shaft bearing 17, to be bored or rebored, and said indicating device is rotated, while the ball point 48 is engaged against said internal surface of said bearing, to cause said ball point to be moved circumferentially of the bearing.

For convenience, the offset portion 71 of the pointer arm 67 normally may be at "0," as in Fig. 3 of the drawings, but the manner of calibrating can be as preferred.

A reading for the indicating device is to be obtained before the actuator bar 46 with ball point 48 is caused to be revolved. In the disclosure as made, a reading can be obtained by sliding said actuator bar 46 along the passageway 29 toward the internal surface of a bearing, such as the internal surface of the crank shaft bearing 17, to be bored or rebored to cause said ball point 48 to be forced against said internal surface of said bearing under pressure sufficient to collapse the compression coil spring 49 and then releasing the actuator bar to permit said compression coil spring 49 to react to cause said actuator bar to be slid along said passageway 29 away from the internal surface of the bearing an extent dictated by the extent to which the compression coil spring 49 was collapsed. In Fig. 5 of the drawings, the ball point 48 is disclosed as when situated against the internal surface of the crank shaft bearing 17 after the compression coil spring 49 has reacted to slide the actuator bar along the passageway 29 in direction away from said internal surface of said crank shaft bearing, and the pointer arm 67 is disclosed at about the midlength of the calibrations 45, or substantially at the location of said calibrations 45 denoted "10" in Fig. 3. The compression coil spring 49 is of greater strength than the coil spring 73 and of sufficient strength to cause the actuator gear 52 to be rotated and the hollow cylindrical element 54 to be swung away from the stop member 57 against which said hollow cylindrical element normally is engaged when said compression coil spring 49 reacts, upon release of the actuator bar 46, after being collapsed by forcing of the ball point 48 against the internal surface of a bearing to be bored or rebored. The reading of the indicating device will remain the same as the reading obtained in the manner as set forth throughout complete revolution of the indicating device with actuator bar 46 in the boring bar support or locating unit 18 and relative to the internal surface of the crank shaft bearing 17 provided said boring bar support or locating unit and said crank shaft bearing are accurately relatively centered and alined. Stated otherwise, should the offset portion 71 of the pointer arm 67 be at "10," for example, of the calibrations 45 at the commencement of rotational movement of the indicating device, said offset portion will remain at "10" throughout complete revolution of said indicating device when, and only when, the boring bar support or locating unit and the crank shaft bearing are accurately centered and alined.

The offset portion 71 of said pointer arm 67 will be retained at "0" of the calibrations 45 at all times when the actuator bar 46 and its ball point 48 are unrestricted, as in Figs. 2 and 4, by reason of the fact that the coil spring 73 normally retains the hollow cylindrical element 54 against the stop member 57 at the side of the indicating device opposite the ball point end of said actuator bar and the position of this stop member dictates the position of said offset portion 71. With forcible sliding movement of the actuator bar 46 toward the internal surface of the crank shaft bearing 17, the actuator gear 52 will be rotated in direction to cause said hollow cylindrical element 54 to have tendency to be swung away from the ball point side of the indicating device, but movement of said hollow cylindrical element from its normal position in direction away from said ball point side of the indicating device obviously will be precluded by said stop member 57 with which the hollow cylindrical element normally is engaged. Instead, there will be sliding turning movement of the teeth of the actuator gear 52 relative to the friction surfaces 59, 59 of the clutching element 58 in response to forcible sliding movement of the actuator bar toward the internal surface of said crank shaft bearing 17. And, too, engagement of the hollow cylindrical element 54 with the stop member 57 at the side of the indicating device adjacent the ball point end of the actuator bar 46 dictates the extent to which the pointer arm 67 can be moved away from "0". In Fig. 3 the limit position to which the offset portion 71 can be moved away from "0" is designated "20". With forcible sliding movement of said actuator bar in direction away from its ball point end after said stop member 57 at said side of the indicating device adjacent said ball point end has been engaged by said hollow cylindrical element 54, there will be sliding turning movement of the teeth of the actuator gear 52 relative to the friction surfaces 59, 59 of the clutching element 58 in direction opposite that in which said actuator gear slides over said friction surfaces when the actuator bar is forcibly slid in direction toward its ball point end. Thus, the clutching element 58 constitutes means for precluding possible breakage of parts of the indicating device, as well as an instrumentality for frictionally retaining the actuator gear 52 and the hollow cylindrical element 54 in fixed relation during swinging movements of said hollow cylindrical element between the stop members 57, 57 in response to rotative movement of said actuator gear.

It will be apparent from the drawings that a part of the ball point 48 projects from the corresponding end of the actuator bar 46. Evidently, the extent of collapsing of the compression coil spring 49 in response to sliding movement of the actuator bar 46 toward the internal surface of a bearing to be bored can be controlled by engagement of the end of said actuator bar 46 having the oblique annular flange 51 with said internal surface thus to accurately control the extent of return movement of said actuator bar when released.

What is claimed is:

1. In an indicating device, a body member including a hollow portion, an actuator bar supported for movement transversely of said body member, a rack rigid and alined with said actuator bar, a supporting block slidably mounted in said hollow portion adjacent said rack for movement toward and away from the rack, means normally resiliently urging said supporting block in direction away from said rack, a pivot pin rigid with said supporting block, and an actuator arm rotatably supported upon said pivot pin for swinging movement in the plane of transverse movement of said actuator bar and rack, said actuator arm including a shorter leg thereof at the side of the pivot pin and supporting block adjacent said rack adapted to be engaged between teeth of the rack and a longer leg thereof at the side of said pivot pin and supporting block opposite said rack adapted to be manually manipulated.

2. In an indicating device, a hollow member, a cross pin supported therein, an actuator gear rotatably mounted on said cross pin, means for causing said actuator gear to be rotated, a hollow element mounted for swinging movement relative to said cross pin and fixed against longitudinal movement, stop means for limiting the extent of swinging movement of said hollow element, a clutching element within said hollow element, and spring means within said hollow element urging said clutching element into frictional engagement with teeth of said actuator gear, said clutching element connecting said hollow element and said actuator gear with each other for swinging movement of the hollow element between said stop members in response to rotational movement of the actuator gear.

3. In an indicating device, a hollow member, an actuator gear therein, means supporting said actuator gear for rotational movement, means for causing said actuator gear to be rotated, an element mounted for swinging movement relative to said actuator gear supporting means and fixed against longitudinal movement, stop means for limiting the extent of swinging movement of said element, a clutching element, and spring means urging said clutching element into frictional engagement with teeth of said actuator gear, said clutching element connecting said element and said actuator gear with each other for swinging movement of the element toward and away from said stop means in response to rotational movement of the actuator gear.

4. In an indicating device, a hollow member, an actuator gear therein, means supporting said actuator gear for rotational movement, means for causing said actuator gear to be rotated constituted as an actuator bar supported for slidable movement transversely of said hollow member, an element mounted for swinging movement relative to said actuator gear supporting means and fixed against longitudinal movement, stop means for limiting the extent of swinging movement of said element, a clutching element, and spring means urging said clutching element into frictional engagement with teeth of said actuator gear, said clutching element connecting said element and said actuator gear with each other for swinging movement of the element toward and away from said stop means in response to rotational movement of the actuator gear.

5. In an indicating device, a hollow member, an actuator gear therein, means supporting said actuator gear for rotational movement, means for causing said actuator gear to be rotated constituted as an actuator bar supported for slidable movement transversely of said hollow member and including a rack engaging teeth of the actuator gear, an element mounted for swinging movement relative to said actuator gear supporting means and fixed against longitudinal movement, stop means for limiting the extent of swinging movement of said element, a clutching element, and spring means urging said clutching element into frictional engagement with said teeth of the actuator gear at a side thereof opposite said actuator bar, said clutching element connecting said element and said actuator gear with each other for swinging movement of the element toward and away from said stop means in response to rotational movement of the actuator gear.

6. In an indicating device, a hollow member including a cylindrical portion, an actuator gear therein, means supporting said actuator gear for rotational movement, means for causing said actuator gear to be rotated constituted as an actuator bar supported for slidable movement transversely of and projecting beyond a side surface of said hollow member, an element mounted for swinging movement relative to said actuator gear supporting means and fixed against longitudinal movement, stop means for limiting the extent of swinging movement of said element, a clutching element, and spring means urging said clutching element into frictional engagement with teeth of said actuator gear, said clutching element connecting said element and said actuator gear with each other for swinging movement of the element toward and away from said stop means in response to rotational movement of the actuator gear.

7. The combination as specified in claim 3, and a pivotally supported pointer arm pivotally connected to said element.

8. The combination as specified in claim 6, and a pivotally supported pointer arm pivotally connected to said element.

9. The combination as specified in claim 4, a point contact member supported by said actuator bar for movement longitudinally thereof, and collapsible resilient means normally urging said point contact member outwardly of an end of said actuator bar.

10. The combination as specified in claim 6, a point contact member supported by said actuator bar for movement longitudinally thereof, and collapsible resilient means normally urging said point contact member outwardly of an end of said actuator bar.

11. The combination as specified in claim 4, a point contact member supported by said actuator bar for movement longitudinally thereof, collapsible resilient means normally urging said point contact member outwardly of an end of said actuator bar, and a pivotally supported pointer arm pivotally connected to said element.

12. The combination as specified in claim 6, a point contact member supported by said actuator bar for movement longitudinally thereof, collapsible resilient means normally urging said point contact member outwardly of an end of said actuator bar, and a pivotally supported pointer arm pivotally connected to said element.

13. In an indicating device, a hollow member, an actuator gear therein, means supporting said actuator gear for rotational movement, means for causing said actuator gear to be rotated constituted as an actuator bar supported for slidable movement transversely of said hollow member, a point member supported by said actuator bar for movement longitudinally thereof, collapsible resilient means normally urging said point member outwardly of an end of said actuator bar, an element mounted for swinging movement relative to said actuator gear supporting means and fixed against longitudinal movement, first and second stop members for limiting the extent of swinging movement of said element, a clutching element, spring means urging said clutching element into frictional engagement with teeth of said actuator gear, said clutching element connecting said element and said actuator gear with each other for swinging movement of the element between said first and second stop members in response to rotational movement of the actuator gear, and a resilient device having strength less than that of said collapsible resilient means normally retaining said element against said first stop member.

14. The combination as specified in claim 13, and a pivotally supported pointer arm pivotally connected to said element.

15. In an indicating device, a hollow member, an actuator bar supported for movement transversely of said hollow member, a rack rigid with said actuator bar, a block slidably mounted in said hollow member for movement toward and away from said rack, means normally urging said block in direction away from said rack, an actuator arm, and means supporting said actuator arm upon said block for swinging movement in the plane of movement of said actuator bar and rack, said actuator arm including a first leg to be engaged between teeth of said rack and a second leg to be manually manipulated at a side of said block opposite the rack.

16. In an indicating device, a hollow member, an actuator gear therein, means supporting said actuator gear for rotational movement, means for causing said actuator gear to be rotated constituted as an actuator bar supported for slidable movement transversely of said hollow member and including a first rack engaging teeth of the actuator gear, an element mounted for swinging movement relative to said actuator gear supporting means and fixed against longitudinal movement, stop means for limiting the extent of swinging movement of said element, a clutching element, spring means urging said clutching element into frictional engagement with said teeth of the actuator gear at a side thereof opposite said actuator bar, said clutching element connecting said element and actuator gear with each other for swinging movement of the element toward and away from said stop means in response to rotational movement of the actuator gear, a second rack rigid with said actuator bar at a side thereof opposite said first rack, a block slidably mounted in said hollow member adjacent and for movement toward and away from said second rack, means normally urging said block in direction away from said second rack, an actuator arm, and means supporting said actuator arm upon said block for swinging movement in the plane of movement of said actuator bar and first and second racks, said actuator arm including a first leg to be engaged between teeth of said second rack and a second leg to be manually manipulated at a side of said block opposite the second rack.

EWALD A. ARP.

REFERENCES CITED

The following references are of record in the file of this patent:

UNITED STATES PATENTS

| Number | Name | Date |
|---|---|---|
| 820,303 | Hansen | May 8, 1906 |
| 1,076,682 | Lucas | Oct. 28, 1913 |
| 1,129,289 | Grant | Feb. 23, 1915 |
| 1,160,630 | MacKinnon | Nov. 16, 1915 |
| 1,649,197 | Senchak | Nov. 15, 1927 |
| 1,695,453 | Carpenter | Dec. 18, 1928 |
| 1,723,529 | Schwieterman | Aug. 6, 1929 |
| 1,876,280 | Dunn | Sept. 6, 1932 |
| 2,099,930 | Emery | Nov. 20, 1937 |
| 2,121,848 | Winters | June 28, 1938 |
| 2,124,006 | Parker | July 19, 1938 |
| 2,124,014 | Street | July 19, 1938 |
| 2,129,311 | Street | Sept. 6, 1938 |
| 2,165,017 | Sisson | July 4, 1939 |
| 2,179,602 | Smith | Nov. 14, 1939 |
| 2,181,077 | Street | Nov. 21, 1939 |
| 2,189,631 | Farmer | Feb. 6, 1940 |
| 2,341,809 | Pearson | Feb. 15, 1944 |
| 2,357,836 | McGreevy | Sept. 12, 1944 |
| 2,445,455 | Rights et al. | July 20, 1948 |

FOREIGN PATENTS

| Number | Country | Date |
|---|---|---|
| 63,052 | Germany | June 27, 1892 |
| 115,057 | Australia | Apr. 23, 1942 |
| 708,168 | France | Apr. 27, 1931 |
| 875,477 | France | June 22, 1942 |